United States Patent
Houston et al.

(10) Patent No.: US 6,650,420 B2
(45) Date of Patent: Nov. 18, 2003

(54) NANOSCALE VIBROMETRIC MEASUREMENT APPARATUS AND METHOD

(75) Inventors: Brian H. Houston, Fairfax, VA (US); Douglas M. Photiadis, Falls Church, VA (US); Joseph F. Vignola, Berwyn Heights, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/083,522

(22) Filed: Feb. 27, 2002

(65) Prior Publication Data

US 2003/0160967 A1 Aug. 28, 2003

(51) Int. Cl.$^7$ ................................. G01B 9/02
(52) U.S. Cl. ................................ 356/501
(58) Field of Search ............... 356/477, 482, 356/496, 500, 501, 511; 73/655, 657

(56) References Cited

U.S. PATENT DOCUMENTS

| | | | |
|---|---|---|---|
| 4,076,378 A | * | 2/1978 | Cole .................. 385/115 |
| 4,604,520 A | | 8/1986 | Pohl |
| 5,473,157 A | | 12/1995 | Grober et al. |
| 5,990,474 A | | 11/1999 | Atia et al. |
| 6,094,971 A | | 8/2000 | Edwards et al. |
| 6,169,281 B1 | | 1/2001 | Chen et al. |
| 6,229,609 B1 | | 5/2001 | Muramatsu et al. |
| 6,232,597 B1 | | 5/2001 | Kley |

OTHER PUBLICATIONS

Udd, Eric. Fiber Optic Sensors: An Introduction For Engineers and Scientists. 1991, John Wiley & Sons, Inc. pp. 16–20.*

* cited by examiner

Primary Examiner—Samuel A. Turner
Assistant Examiner—Michael A. Lyons
(74) Attorney, Agent, or Firm—John J. Karasek; L. George Legg

(57) ABSTRACT

An apparatus for measuring the amount of motion of the surface of a microscopic object includes a light source, an optical fiber for transmitting the light, and a collection objective. The optical fiber emits the light output through an aperture tapered to a diameter in the range of from 20 nm to 200 nm. The collection objective is positioned to receive both the direct component of the fiber light output and the Doppler-shifted reflected light of the fiber light output from the surface of the object. The direct component and the Doppler-shifted reflected light combine in the collection objective to form an interfered light signal that is output to a photo-receiver. The intensity of the interfered light signal is modulated by the relative phase shift between the two interfering beams and is proportional to the out-of-plane displacement caused by the surface motion of the object surface. The photo-receiver receives the interfered light signal and converts it to an electrical signal that is proportional to the light intensity and representative of the amount of the surface motion of the object. A signal processor processes the electrical signal and outputs the amount of surface motion of the object's surface. A tip altitude control system positions the output end of the optical fiber relative to the surface of the sample. A movable stage receives and secures the object in order to enable measurements to be taken at a plurality of locations on the surface of the object. In addition to measuring surface motion and detecting small mass changes on an object's surface, the invention may be used to measure high frequency surface phonons.

20 Claims, 4 Drawing Sheets

NANOSCALE VIBROMETRIC MEASUREMENT APPARATUS AND METHOD

TECHNICAL FIELD

This invention relates to an apparatus and method for measuring the dynamic response of a surface of an object. More particularly, the invention relates to an apparatus and method for resolving the dynamic surface motion of small structures by vibration measurement.

BACKGROUND ART

Surface Acoustic Measurement-Laser Doppler Vibrometry (LDV):

The measurement of the vibratory motion of a surface or structure is desired in a number of research and commercial applications. Typically in these applications, the desire exists to minimize the loading of the sensor on the structure of interest. For macroscale systems, for example, this may be accomplished by the attachment of an array of small, low mass, accelerometers to the structure or by the use of scanning laser Doppler vibrometry (LDV). In LDV systems, a laser-based interferometer is used where the scattered light is interfered with a reference beam to measure a Doppler phase shift induced by the moving surface. For these systems, the spatial resolution is diffraction limited and is typically several microns in size. Further, in addition to minimizing the structural loading, LDV systems are capable of operating up to frequencies that are not attainable by conventional accelerometers.

LDV is an established technique where the motion of a surface is measured by use of a laser-based interferometer and where the scattered light is interfered with a reference beam to measure a Doppler phase shift induced by the motion of the sample's surface. In a conventional LDV system, a typical method of creating an interferometer is to use a Michelson format where the source laser beam is split by an optical element. The first of the two beams is preserved as a reference and is unperturbed. The second beam is delivered to the sample surface, is scattered, and is interfered with the reference beam. Other interferometric architectures are possible. This includes, for example, the so-called differential interferometric approaches where both beams are scattered off of the surface and recombined. The differential phase shift is used to measure the surface motion. Disadvantages of LDV are primarily associated with its use in applications where a simultaneous measurement is required from a spatial array of devices. This is sometimes accomplished by use of an optical or mechanical scanning configuration in conjunction with LDV. LDV methods are not generally applicable when continuous monitoring of structural motion is required and are generally complex and costly.

Near-Field Scanning Optical Microscopy NSOM:

NSOM is a well-known technique that is used for sub-wavelength microscopic imaging. The technique typically involves positioning a probe, consisting of a sub-wavelength aperture in the form of a tapered optical fiber, in close proximity to a surface, illuminating the surface with the probe, and by observing and measuring one or more characteristics of the transmitted or reflected light, providing an image of the surface.

One such technique, described in U.S. Pat. No. 5,990,474, involves a method and apparatus for making phase and amplitude measurements utilizing a reflection mode. A tapered NSOM optical fiber probe is used in conjunction with an optical interferometer to position the probe near a surface in order to image the surface. The tip of the probe serves as both a source of the light illuminating the surface and a receiver of the light scattered or reflected from the surface. The patent, however, discloses that there are disadvantages to utilizing the probe tip for both these functions, as the received low light level greatly reduces the signal-to-noise (SNR) ratio. The signal losses necessitate the use of a tip having a relatively large aperture, thereby inherently limiting the spatial resolution since spatial resolution is determined by the size of the probe's aperture. Furthermore, this device is limited to surface imaging applications and cannot measure surface dynamics or motion.

Another technique, described in U.S. Pat. No. 6,169,281, uses a scanning probe microscope for examining surface anomalies such as grooves and ridges in a sample surface. The microscope includes a probe tip attached to a mounting surface, that is placed in proximity to a sample surface. The apparatus also includes drive mechanisms for dithering the probe tip and a detector responsive to vibration of the probe. The detector output is used to determine topographical features of the sample surface and is not applicable to measuring surface dynamics or motion.

In yet another approach, described in U.S. Pat. No. 6,229,609, a NSOM microscope that includes a probe, a light source and optics for illuminating a sample, and a converter and optics for receiving light reflected from the sample, makes measurements using high resolution AFM and optical techniques. The probe is hooked, but otherwise operates in a conventional manner, and as with other such prior art devices, the microscope is capable of just surface imaging.

Another approach described in U.S. Pat. No. 5,473,157 is directed to a variable temperature NSOM microscope for implementing NSOM over a broad temperature range. It is housed within a cryostat and utilizes a mirror assembly to collect light from a sample tip. The optical processing consists of collecting the light scattered from the sample surface and moving it, by use of fiber optics, to a spectrometer. The main function of the microscope is to obtain spectrographic analysis from NSOM light scattered from a sample surface. The device is limited to surface imaging, and is not applicable to measuring surface dynamics or motion.

Still another approach described in U.S. Pat. No. 6,232,597 is directed to a scanning probe microscope configured to identify deep surface features by detecting rotationally polarized light that interacts with an object.

There remain, however, applications in which these approaches for obtaining a simple image of a surface are inadequate. These applications include the design and operation of a wide variety of micro electromechanical systems (MEMS) and nano electromechanical systems (NEMS) devices. For example, in a significant application involving resonators, it is important to understand the vibratory mode shape of the resonator and the surrounding attachments. Included are mechanical devices that function as an RF component, or as a component of a chemical sensor where small mass changes are detected due to the adsorption of airborne molecules. Further, there are applications in research where measurement of high frequency surface phonons is desired where the wavelengths of interest are sub-micron as well. There are also applications in biological studies where a probe is useful for imaging the motion of proteins and large molecules.

Until now, broadband surface acoustic measurements for small (sub-micron) systems have been limited by the diffraction limit imposed on the bulk and fiber-optic components available. These techniques have therefore proven useful only for lateral spatial resolutions on the scale of microns or larger, and for frequencies of about 30 MHz. For systems that are smaller than a micron, the discernment of the normal mode structure is not possible with diffraction limited optical systems, and therefore the detailed vibratory motion and the coupling of the system to the attached structure cannot be directly observed. Rather, information in this regard is intuited by the measurement of indirect properties. For example, one might measure the Q (quality factor) of a resonator through an electrical property measurement. However, for many MEMS and NEMS systems, understanding the details of the vibratory response is essential to understanding what controls the quality factor. Moreover, most of the systems of interest at these small scales have correspondingly higher resonant frequencies, and for a sub-micron vibration measurement technique to be useful, it must also have a large bandwidth capability associated with it. The resonant frequencies of many of the MEMS and NEMS devices of interest are in the 0.1–5 GHz range. There therefore remains a need for a device and technique for accurately measuring surface acoustic vibration at submicron length scales and ultra-high frequencies.

DISCLOSURE OF THE INVENTION

A non-contact vibrometric measurement apparatus for measuring an amount of motion of a surface of an object includes a light source, an optical fiber for transmitting the light, and a collection objective. The optical fiber emits the light output through an aperture that is preferably tapered to a diameter in the range of from 20 nm to 200 nm. The collection objective is positioned to receive both a direct component of the fiber light output and a Doppler-shifted reflected light of the fiber light output from the surface of the object. The direct component and the Doppler-shifted reflected light combine in the collection objective to form an interfered light signal that is output to a photo-receiver. The interfered light signal has an intensity that is modulated by the relative phase shift between the two interfering beams and that is proportional to an out-of-plane displacement caused by the surface motion of the object surface. The photo-receiver receives the interfered light signal and converts it to an electrical signal that is proportional to the light intensity and representative of the amount of the surface motion of the object. A signal processor processes the electrical signal and outputs the amount of surface motion of the object's surface. A tip altitude control system positions the output end of the optical fiber relative to the surface of the sample. A movable stage receives and secures the object in order to enable measurements to be taken at a plurality of locations on the surface of the object.

The non-contact vibrometric measurement tool resolves dynamic motion at sub-micron lateral spatial scales and ultra-high frequencies (f>1 GHz). It is useful for the design and operation of a wide variety of MEMS (Micro Electromechanical Systems) and NEMS (Nano Electromechanical Systems) devices that include various types of sensors and RF components as well as surface acoustic wave (SAW) devices. The device is also useful for basic research into continued electronic miniaturization for which one limitation is non-equilibrium heating. The invention would enable the direct measurement of the underlying phonon spectrum and therefore aid in the development of novel nanostructures/materials.

In this invention, the interfered signals are achieved in a much simpler fashion than existing LDV systems in that significant optical components are not required. The system detects broad-band surface displacements, by monitoring the intensity of the optical signal with the photodetector. The preferred embodiment is also the most simple one where the light that radiates from the tip is interfered with the reflected signal off of the moving sample surface. The light from a laser is launched into an optical fiber that is terminated by the optical tip. When the tip is brought into close proximity to the surface, light from the tip scatters off of the moving sample surface and is collected by a lens and delivered to a photodiode detector. Some of the light radiating from the tip travels directly to the collection lens and serves as an unmodified reference beam. The two fields interfere all along the path from the tip to the collection objective so that no additional optical element is need to accomplish this function.

In addition to being a useful diagnostic tool, the invention is also useful in other applications, for example, as a displacement sensor to yield an output proportional to a transducer's displacement when integrated on a chip as part of a micro or nano scale system. In one embodiment, the invention can be implemented in an array-like configuration to permit the simultaneous measurement of multiple displacement signals. In another embodiment, the invention may be employed as a displacement readout sensor, enabling the highly efficient transduction of nanoscale system components and facilitating fabrication of devices not otherwise possible at the nanoscale level using other approaches such as capacitive sensors, which exhibit high noise at small scale.

Additional features and advantages of the present invention will be set forth in, or be apparent from, the detailed description of preferred embodiments which follows.

BEST MODE FOR CARRYING OUT THE INVENTION

Figure 1:
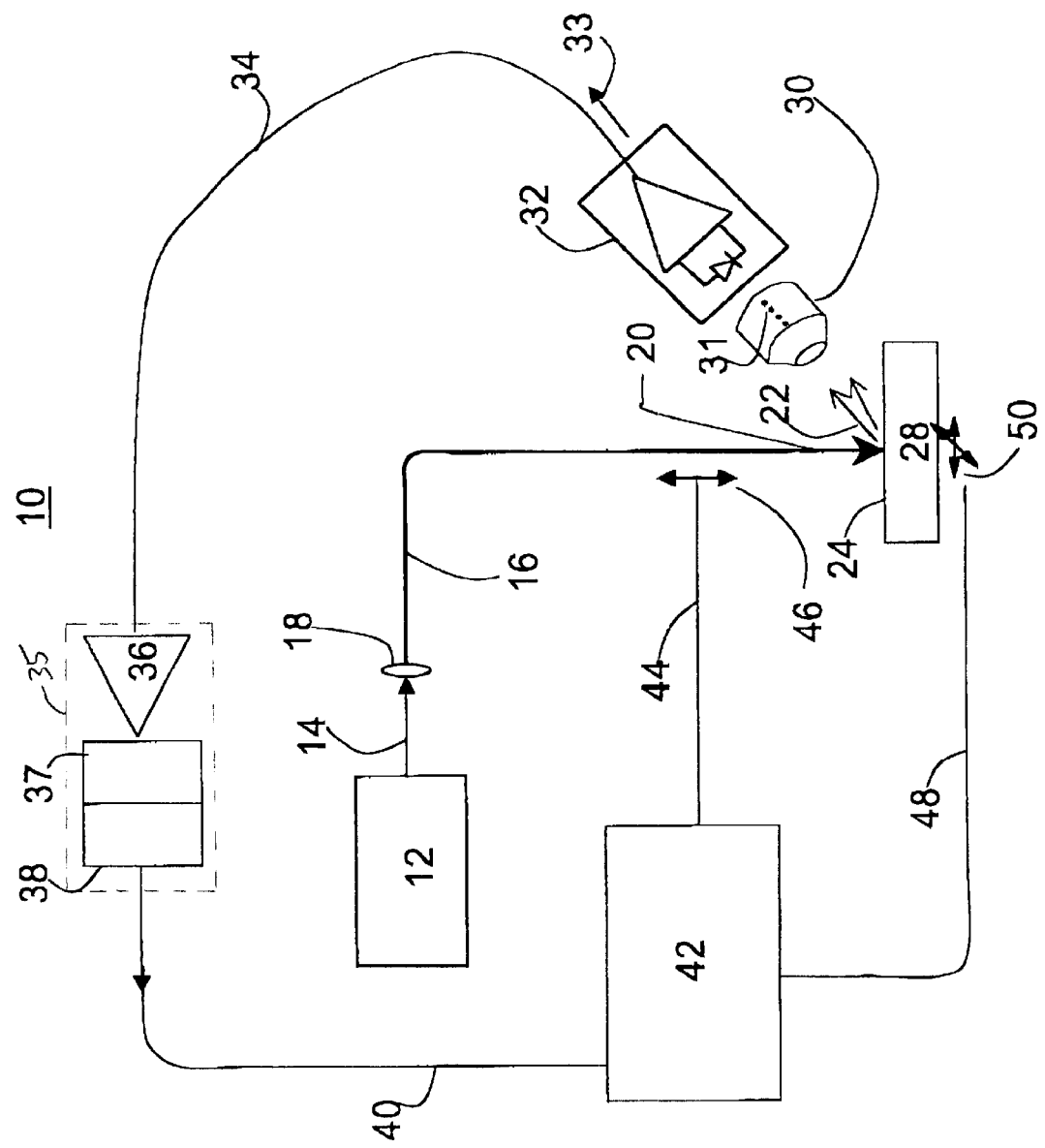
FIG. 1 is a schematic diagram of a vibrometric measurement system according to the invention.
Figure 2:
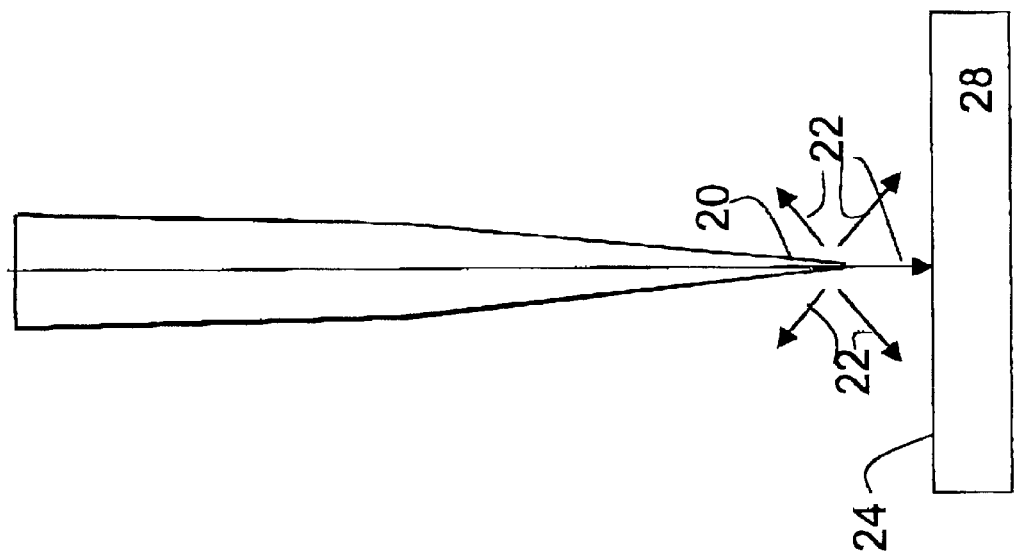
FIG. 2 is a schematic illustration of a tapered optical fiber tip according to the invention.
Figure 3:
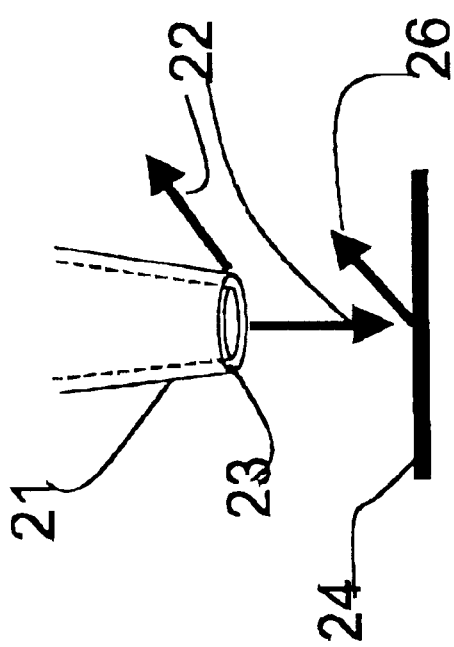
FIG. 3 is a schematic diagram showing further detail according to the invention.

Referring now to FIGS. 1–3, a vibrometric measurement system 10 includes a light source 12 for emitting a source light along an optical path 14. Light source 12 is preferably a laser light source emitting a coherent, linearly polarized light. An optical fiber 16 positioned in optical path 14 includes an input end 18, for receiving light and efficiently coupling it to fiber 16, and a tapered output end 20 for emitting a fiber output light 22 in a spherical fashion. Fiber 16 is preferably single-mode fiber at the selected light wavelength of laser source 12. Light 22 radiates in a spherical fashion from an aperture 23 at output end 20 so as to be collected by a collection objective 30 while also illuminating a surface 24 of an object 28. Useful types of collection objectives 30 include microscope objectives, e.g. large numerical aperture microscope objectives with 0.4–0.9 numerical apertures and magnifications of about 50×, such as model nos. APO SL 50× and M Plan APO 50× manufactured by Mitutoyo.

Light 22 scattered from surface 24 produces a scattered light 26 having a Doppler phase shift induced by the motion of surface 24 that is also collected by collection objective 30. In this manner, collection objective 30 collects both the Doppler-shifted light 26 and the light 22 radiating unshifted from tip 520, therefore serving as a reference. The interference of the two light signals 22 and 26 forms an interfered light signal 31 containing the required information about the surface motion as is further explained below. The collection objective 30 focuses interfered light signal 31 onto a photo-receiver 32 that produces an electrical voltage signal 33 proportional to the light intensity through a square law operation as is further explained below. Photo-receiver 32 can be fabricated using either solid state photodiodes or photo-multipliers as is well known in the art. Voltage signal 33 is sent via a suitable electrical conductor 34 to a signal processor 35 that includes a preamplifier 36 and an analog-to-digital converter 37 having a resident memory 38. The electrical signal carried on conductor 34 is proportional to the surface 24 displacement as a function of time, therefore no additional signal processing is needed to extract the surface motion information. Data storage is typically accomplished by the passage of data from memory 38 via a suitable communications buss 40 to a computer 42. Alternatively, memory 38, buss 40, and computer 42 may be replaced or supplemented by a digital oscilloscope (not illustrated).

System 10 includes a tip altitude control system whereby the altitude of tip 20 is established via actuation signals communicated over suitable conductors 44 to a piezoelectric element 46 under control of computer 42. The scanning of the in-plane lateral dimensions of the object surface 24 to produce vibrometric measurements is accomplished by manipulation of a two-dimensional stage 50, e.g. a Piezosystem Inc. nano-positioning system Model ENV40CAP, to which object 28 is attached, under control of computer 42 via actuation signals communicated over suitable conductors 48 in a coordinated fashion with tip 20. A complete measurement typically consists of such a coordinated movement to about 1000 or more spatial locations associated with surface 24, with the computer 42 collecting the interferometric data at each location sufficient to allow recovery of the desired broadband motion.

In this manner, vibrometric measuring system 10 essentially integrates two technologies, combining optical elements having laser Doppler vibrometry (LDV) capabilities and a nearfield scanning optical microscope (NSOM) approach including a nearfield optical element capable of achieving spatial resolutions as small as 20 nm. The NSOM aspect includes components and methods known in the art, e.g. as described in U.S. Pat. No. 4,604,520, incorporated herein by reference, for controlled positioning of tip 20 in close proximity, e.g. about 15 nm, to a sample's surface and scanning (moving) tip 20 laterally in order to compile a vibrometric image. Altitude control of tip 20 is accomplished by use of a well known technique commonly employed in conventional NSOMs, e.g. as described in U.S. Pat. No. 6,094,971, incorporated herein by reference. In this approach, a Quartz tuning fork is attached just above fiber tip 20 and the tip assembly (not illustrated) is attached to a PZT (not illustrated) that, when provided with a voltage, moves the tip assembly in the vertical direction. The electrical signal associated with the tuning fork oscillation is used as a feedback signal to the PZT actuator that senses the distance between the aperture 23 and the sample surface 24; the amplitude and frequency of this signal being modified by proximity of the tip aperture 23 to surface 24.

The lateral motion of tip 20 is accomplished by any number of methods. One method is placing the sample of interest on a mechanically actuated table which can be positioned by computer control in a Cartesian workspace. In this implementation, the sample surface is positioned to discrete locations and does not move while data is being taken. The data is acquired by high speed analog to digital conversion of the photodetector output with subsequent storage to a data acquisition computer. The computer is the overall coordinator of the measurement process where the movement of the sample, the positioning of the probe tip above the surface, and the acquisition and storage the photoreceiver signal is executed under program control. Another approach replaces the Cartesian positioning stage with a device such as a slotted PZT cylinder that allows the tip to be moved laterally.

The nearfield optical element is based on an extension of fiber optic technology and is commonly referred to as a Nearfield Scanning Optical Microscope (NSOM) tip. It is an optical fiber waveguide that has been heated and then pulled to form tip 20. In this manner, a tip can be fabricated to include an aperture 23 as small as 20 nm in diameter; the aperture diameter determines the ultimate spatial resolution of the device. The aperture 23 diameter is preferably in the range of from about 20 to about 200 nm. Tip 20 is preferably metalized to include a metal outer surface layer 21 to trap light within the glass and help guide light to aperture 23. As aperture 23 is brought into close proximity to surface 24, the evanescent nearfield radiation from aperture 23 has a waist diameter that is approximated by the tip aperture 23 diameter. When aperture 23 is positioned further from surface 24, i.e. at a distance greater than the diameter of aperture 23, then the radiating field diverges as if radiating from a point source, as illustrated in FIG. 3. Accordingly, maintaining a distance between aperture 23 and surface 24 that is approximately equal or less than the aperture 23 diameter is preferred in order to obtain good lateral resolution.

The intensity at photoreceiver 32 is modulated by the relative phase shift between the two interfering beams and is generally given by $I=A+B\cos(\theta)$, where A and B are constants and the signal $\theta$ is the relative optical phase shift between the two beams and is proportional to the out-of-plane displacement for the small displacement levels ($d<<\lambda$) present in the intended applications. The bandwidth of the measurement is only limited by the receiver photodiode or photomultiplier tube used as the photoreceiver 32 of the interfered signals. With regard to the speed of the present optical detector technologies, risetimes of approximately 1011 Hz are considered state-of-the-art. With regard to the detection scheme described herein, it is extremely robust and does not suffer from some of the typical signal fading problems common with other interferometric approaches. For example, no heterodyning section is required and no method of compensating for polarization fading of the signal is required.

Figure 4A:
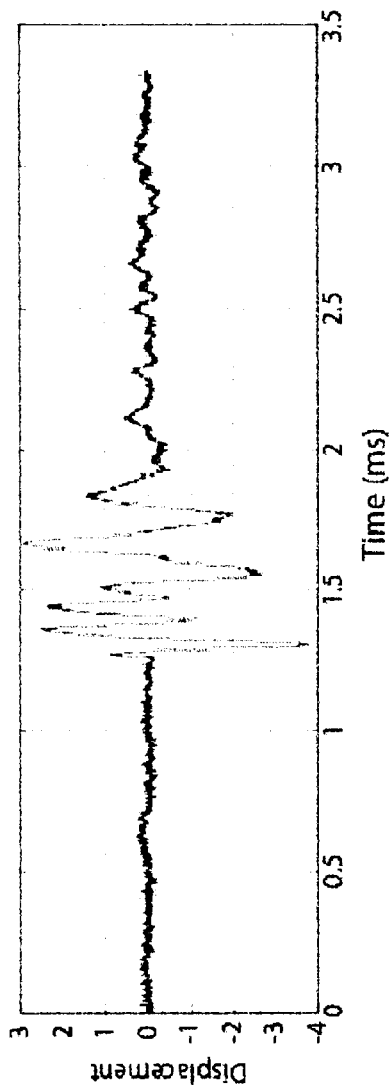
FIGS. 4a and b are data obtained using a vibrometric measurement system according to the invention.
Figure 4B:
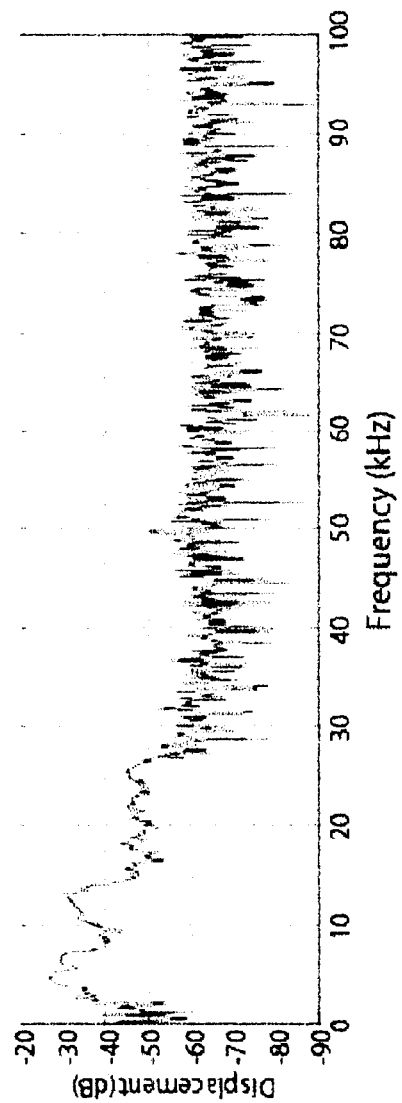

FIGS. 4a and 4b show graphs of representative output obtained using the invention. FIG. 4a graphs a time domain signal that is a transient displacement of the surface of a sample that has been mechanically energized by a piezoelectric transducer. The y-axis is displacement and the x-axis is time (milliseconds). The sample is energized with an impulse that is 200 ns in duration. This impulsive excitation excites the normal modes of the sample over a broad range of frequencies. The Fourier transform of the time trace of FIG. 4a is shown in FIG. 4b, where the y-axis is displacement and the x-axis is frequency, with a maximum frequency of 100 kHz. In this example, the energy in the response is predominantly at frequencies below 27 kHz. Although this is a relatively low frequency, it is merely illustrative, since the invention is capable of very broadband use where the maximum frequency is determined by the bandwidth of the photoreceiver. Further, the instrument is also capable of obtaining measurements such as those shown in these figures, that are the result of scanning. Such scans are acquired over a rectangular workspace, for example a 100 micron×100 micron area, and contain several thousand spatial points resulting in a coherent and broadband map of the modal response of the structure.

Obviously many modifications and variations of the present invention are possible in light of the above teachings. It is therefore to be understood that the scope of the invention should be determined by referring to the following appended claims.

What is claimed is:

1. A vibrometric measuring apparatus for measuring an amount of surface motion of a surface of an object, comprising:
    a light source for outputting a source light having a wavelength along an optical path;
    an optical fiber positioned in the optical path and comprising an input end for receiving the source light and an output end including an aperture for emitting a fiber light output, said aperture having a diameter less than said source light wavelength;
    a collection objective positioned with respect to said aperture, so as to collect a direct component of the fiber light output, and positionable with respect to the object so as to collect a Doppler-shifted reflected light of the fiber light output from the surface of the object, said direct component of the fiber light output and said Doppler-shifted reflected light thereby comprising two interfering beams combining to form an interfered light signal having an intensity modulated by a relative phase shift between the two interfering beams that is proportional to an out-of-plane displacement caused by the surface motion of said surface;
    a photo-receiver comprising an input and an output, said input of said photo-receiver disposed for receiving and converting the interfered light signal to an electrical signal proportional to the intensity and representative of the amount of surface motion of the object;
    a signal processor comprising an input for receiving and processing the electrical signal and an output for indicating the amount of surface motion of said surface;
    a tip altitude control system for positioning the output end of the optical fiber relative to the surface of the sample; and
    a movable stage for receiving and securing the object so as to enable measurements to be taken at a plurality of locations on the surface.

2. A vibrometric measuring apparatus as in claim 1, wherein the tip altitude control system comprises:
    a programmable computer for controlling the amount of desired movement and altitude relative to the surface of the sample of the output end of the optical fiber; and
    means for positioning the tip in response to a control signal from the computer.

3. A vibrometric measuring apparatus as in claim 1, wherein the output end of the optical fiber comprises a tapered tip.

4. A vibrometric measuring apparatus as in claim 3, wherein the tapered tip includes an outer surface having a metallic coating thereon.

5. A vibrometric measuring apparatus as in claim 3, wherein the tapered tip has a diameter in the range of from about 20 to about 200 nm.

6. A vibrometric measuring apparatus as in claim 1, wherein the light source is a laser.

7. A vibrometric measuring apparatus as in claim 1, wherein the collection objective is a large numerical aperture microscope objective.

8. A vibrometric measuring apparatus as in claim 1, wherein the relative phase shift between said two interfering beams is determined from the intensity modulation equation $I=A+B \cos(\theta)$ where A and B are constants and the signal $\theta$ is the relative optical phase shift between said two interfering beams and is a broadband time-varying signal.

9. A method for measuring the surface motion of the surface of an object, comprising the steps of:
    (a) generating a source light having a wavelength;
    (b) providing an optical fiber having an input end and an output end, said output end including an aperture therein, said aperture having a diameter less than said source light wavelength;
    (c) positioning the output end of the optical fiber at a desired position relative to the surface of the sample;
    (d) inputting the source light into the input end;
    (e) transmitting the light from the aperture of the optical fiber toward the surface of the object;
    (f) providing a collection objective;
    (g) in the collection objective, collecting a direct component of the light transmitted from the aperture while collecting a Doppler-shifted light reflected from the surface of the object, said direct component and said Doppler-shifted reflected light thereby comprising two interfering beams that combine to form an interfered light signal having an intensity modulated by a relative phase shift between the direct component and the Doppler-shifted reflected light that is proportional to an out-of-plane displacement caused by the surface motion of said surface;
    (h) receiving and converting the interfered light signal to an electrical signal proportional to the intensity and representative of the amount of the surface motion of the object;
    (i) receiving and processing the electrical signal; and
    (j) outputting a measurement of the amount of surface motion of said surface.

10. A method as in claim 9, further comprising repeating steps (c)–(e) and (g)–(j) for a plurality of positions of the output end of the optical fiber relative to the surface of the object to thereby acquire data while scanning the surface of the object with the output end of the optical fiber.

11. A method as in claim 9, wherein the step of generating a source light comprises generating a laser light.

12. A method as in claim 9, wherein the relative phase shift between said two interfering beams is determined from the intensity modulation equation $I=A+B \cos(\theta)$ where A and B are constants and the signal $\theta$ is the relative optical phase shift between said two interfering beams and is a broadband time-varying signal.

13. A method as in claim 9, further comprising the step of maintaining a desired distance between the output end of the optical fiber and the surface of the sample.

14. A method as in claim 13, further comprising repeating steps (c)–(e) and (g)–(j) for a plurality of positions of the output end of the optical fiber relative to the surface of the object to thereby acquire data while scanning the surface of the object with the output end of the optical fiber.

15. A vibrometric measuring apparatus for measuring an amount of surface motion of a surface of an object, comprising:

a light source for outputting a source light having a wavelength along an optical path;

an optical fiber positioned in the optical path and comprising an input end for receiving the source light and a tapered tip output end including an aperture for emitting a fiber light output, said aperture having a diameter less than said source light wavelength;

a collection objective positioned with respect to said aperture, so as to collect a direct component of the fiber light output, and positionable with respect to the object so as to collect a Doppler-shifted reflected light of the fiber light output from the surface of the object, said direct component of the fiber light output and said Doppler-shifted reflected light thereby comprising two interfering beams combining to form an interfered light signal having an intensity modulated by a relative phase shift between the two interfering beams that is proportional to an out-of-plane displacement caused by the surface motion of said surface;

a photo-receiver comprising an input and an output, said input of said photo-receiver disposed for receiving and converting the interfered light signal to an electrical signal proportional to the intensity and representative of the amount of surface motion of the object;

a signal processor comprising an input for receiving and processing the electrical signal and an output for indicating the amount of surface motion of said surface;

a tip altitude control system for positioning the output end of the optical fiber relative to the surface of the sample tip altitude control system comprising a programmable computer for controlling the amount of desired movement and altitude relative to the surface of the sample of the output end of the optical fiber and means for positioning the tip in response to a control signal from the computer; and a movable stage for receiving and securing the object so as to enable measurements to be taken at a plurality of locations on the surface.

16. A vibrometric measuring apparatus as in claim 15, wherein the tapered tip output end includes an outer surface having a metallic coating thereon.

17. A vibrometric measuring apparatus as in claim 15, wherein the tapered tip output end has a diameter in the range of from about 20 to about 200 nm.

18. A vibrometric measuring apparatus as in claim 15, wherein the light source is a laser.

19. A vibrometric measuring apparatus as in claim 15, wherein the collection objective is a large numerical aperture microscope objective.

20. A vibrometric measuring apparatus as in claim 15, wherein the relative phase shift between said two interfering beams is determined from the intensity modulation equation $I=A+B\cos(\theta)$ where A and B are constants and the signal $\theta$ is the relative optical phase shift between said two interfering beams and is a broadband time-varying signal.

* * * * *